United States Patent [19]

Soderberg

[11] Patent Number: 4,962,911
[45] Date of Patent: Oct. 16, 1990

[54] HEMI-WEDGE VALVE

[75] Inventor: Paul B. Soderberg, Houston, Tex.

[73] Assignee: Soderberg Research & Development, Inc., Houston, Tex.

[21] Appl. No.: 500,001

[22] Filed: Mar. 27, 1990

[51] Int. Cl.⁵ .......................... F16K 25/00; F16K 1/18
[52] U.S. Cl. .................................. 251/159; 251/172; 251/174; 251/177; 251/301
[58] Field of Search ............... 251/159, 170, 172, 174, 251/177, 179, 192, 193, 228, 229, 298, 300, 301, 304

[56] References Cited

U.S. PATENT DOCUMENTS

| | | | |
|---|---|---|---|
| 2,883,147 | 4/1959 | Mirza et al. | 251/172 |
| 3,123,334 | 3/1964 | Hitz | 251/300 |
| 3,404,864 | 10/1968 | Reddy | 251/172 |
| 3,521,855 | 7/1970 | Jensen | 251/172 |
| 3,799,188 | 3/1974 | Chronister | 251/301 |
| 4,130,268 | 12/1978 | Kojima et al. | 251/174 |
| 4,253,485 | 3/1981 | Legille | 251/174 |
| 4,319,734 | 3/1982 | Acar | 251/174 |
| 4,477,055 | 10/1984 | Partridge | 251/174 |

FOREIGN PATENT DOCUMENTS 1295939 3/1969 Fed. Rep. of Germany ...... 251/172
587382 4/1947 United Kingdom ................ 251/192

*Primary Examiner*—George L. Walton
*Attorney, Agent, or Firm*—Browning, Bushman, Anderson & Brookhard

[57] ABSTRACT

The present invention is directed to an improved valve comprising a valve housing, a fluid path therethrough, a seat disposed about the fluid path, a rotatable, curved wedge disposed in the fluid path, an actuator for rotating the wedge between its closed and opened positions and a fixed member for displacing the wedge longitudinally toward the seat as it is rotated between its opened and closed positions. Preferably, the seat is biased toward the hemi-wedge. The rotatable, curved wedge has a curved sealing surface for cooperation with the seat. The wedge includes a bore through its thinner end forming a part of the fluid flow path when opened while its thicker end blocks the fluid flow path in the closed position. The sides of the wedge are curved, one side providing a convex sealing surface and the other side providing a concave thrust surface. Rotation of the hemi-wedge from the opened to the closed position displaces the sealing surface thereof toward the seat while maintaining the same relative orientation between the sealing surface and the seat.

20 Claims, 5 Drawing Sheets

HEMI-WEDGE VALVE

BACKGROUND OF THE INVENTION

1. Field of the Invention

The present invention generally relates to an improved valve. More specifically, the present invention is directed to a new, novel hemi-wedge valve employing a rotatable, curved wedge to enjoy advantages over conventional valves, e.g., the plug cock valve, the gate valve and the ball valve.

2. Description of the Background

Many valve types have been employed for stopping and controlling the flow of fluids in a pipe or other flow path. Each of these valves offers certain advantages while suffering from other disadvantages. These valve types include plug cock valves, ball valves, screw-down stop valves, angle valves, butterfly valves, gate valves and sluice valves.

A simple plug cock valve comprises a rotatable, tapered plug having a bore therethrough disposed in a complimentary tapered housing. The plug cock valve permits fluid flow to be fully stopped by rotating the plug not more than ninety degrees (90°). However, these valves offer only minimal graduated control of fluid flow by setting the plug cock at intermediate positions and require modification for use in high pressure environments.

Ball valves comprises a rotatable ball having a bore therethrough corresponding to the fluid flow path together with a seat for sealing with the ball surface. Ball valves operate similarly to the previously described plug cock valves and offer similar advantages and disadvantages.

More accurate flow control is obtained with conventional screw-down stop valves wherein a circular sealing element is disposed on the end of a threaded actuator or stem for cooperation with a seat disposed about an opening through which the fluid flows. Rotation of the actuator gradually lifts the sealing element, such as a washer or other device, away from the seat to provide more accurate control of gradual changes in the fluid flow. A variation of the screw-down stop valve is the needle valve where the stem Conventional gate or sluice valves are often employed in high flow and high pressure operations. These valves comprise a solid gate which is moved perpendicularly into the fluid path to block the flow. These gates may have either flat or inclined sides forming a flat or wedge shaped gate which is moved generally perpendicular to the fluid flow by rotation of a threaded handle operatively connected thereto.

The valves described above fail to provide a valve operable between stops defining its fully opened and fully closed positions in a quarter of one rotation or less while providing improved sealing in high pressure applications and shielding of the seat surface from erosion by the flowing fluid in both the opened and closed positions. Those skilled in the art have long sought and will appreciate the novel features of the present invention which solves these problems.

SUMMARY OF THE INVENTION

The present invention is directed to an improved valve employing a rotatable, curved valve member having a sealing surface displaceable toward its cooperating seat. The valve member is convex on its side adjacent the valve seat, concave on its side opposite the valve seat, with the convex and concave surfaces eccentrically aligned so that the thickness of the member increases from its first, leading end to its second, trailing end. The valve member is further characterized by an opening therethrough near the first, leading end from its concave side to its convex side to form a part of the fluid flow path when the valve is in its opened position.

In a preferred embodiment the displaceable, curved sealing surface is provided by one side of a rotatable hemi-wedge, i.e., a wedge having curved sides so that a first, convex side forms a curved sealing surface, a second, concave side forms a curved thrust surface for cooperation with a complimentary curved, fixed surface in the valve housing and the thickness of the wedge increases from its leading end to its trailing end. The hemi-wedge is further characterized by a bore forming a part of the fluid path through its thinner, leading end so that the valve is opened when this bore is disposed in the fluid path. Rotation of the hemi-wedge through about ninety degrees (90°) gradually closes the fluid path by blocking it with the thicker end of the wedge. Rotation causes the convex, sealing side to be displaced toward the seat as the concave side rotates about the relatively fixed thrust surface.

In more preferred embodiments, the sealing and thrust surfaces of the hemi-wedge are portions of spheres or the curved portions of cylinders. In the most preferred embodiment they are portions of spheres. In the most preferred embodiment, the center of the sphere defining the sealing surface moves substantially linearly along a line defined by the center of the sphere and the center of the seat while the center of the sphere forming the thrust surface is dipsosed off that line and moves substantially perpendicularly thereto and not linearly therealong as the hemi-wedge is rotated between the closed and opened positions. In the alternative embodiment where the sealing and thrust surfaces of the hemi-wedge are formed by the curved portions of cylinders, the cylinders are preferably right cylinders.

In the preferred embodiments, the seat is displaceable along the fluid flow path in response to displacement of the convex sealing surface of the hemi-wedge as the thicker part thereof is moved into the fluid flow path. The seat is preferably biased toward the hemi-wedge to provide improved seal integrity.

Further improvement in the seal integrity is achieved by another aspect of the present invention. The sealing surface of the seat is preferably concave in cross-section where it meets the hemi-wedge and is comprised of a resiliently deformable material. Accordingly, the seat initially contacts the hemi-wedge at the leading edges of the concavity, later deforming to provide an enlarged sealing surface as the hemi-wedge is displaced toward the seat and the biasing means of the seat is compressed. In its most preferred embodiment, the seat is formed integrally on the end of a metallic seat insert to provide a metal-to-metal seal with a metallic hemi-wedge. Such an arrangement is particularly useful in high pressure pipelines transporting flammable fluids.

BRIEF DECRIPTION OF THE DRAWINGS

Other features and intended advantages of the present invention will be readily apparent by the references to the following detailed description in connection with the accompanying drawings, wherein.

While the invention will be described in connection with the presently preferred embodiment, it will be understood that is not intended to limit the invention to this embodiment. On the contrary, it is intended to cover all alternatives, modifications and equivalents as may be included in the spirit of the invention and as defined in the appended claims.

DETAILED DESCRIPTION OF THE PREFERRED EMBODIMENT

The present invention combines and improves on the advantages of conventional plug cock, ball and gate valves in a new, novel hemi-wedge valve employing a rotatable, curved wedge for controlling fluid flow. The most significant novel feature of the present invention is its unique rotatable, curved wedge and the improved seal achieved when this hemi-wedge is actuated about a relatively fixed thrust ball to displace the sealing surface of the hemi-wedge toward the seat.

The unique valve member is convex on its side adjacent the valve seat, concave on its side opposite the valve seat, with the convex and concave surfaces eccentrically aligned so that the thickness of the member increases from its first, leading end to its second, trailing end. The valve member is further characterized by an opening therethrough near the first, leading end from its concave side to its convex side to form a part of the fluid flow path when the valve is in its opened position.

Figure 1:
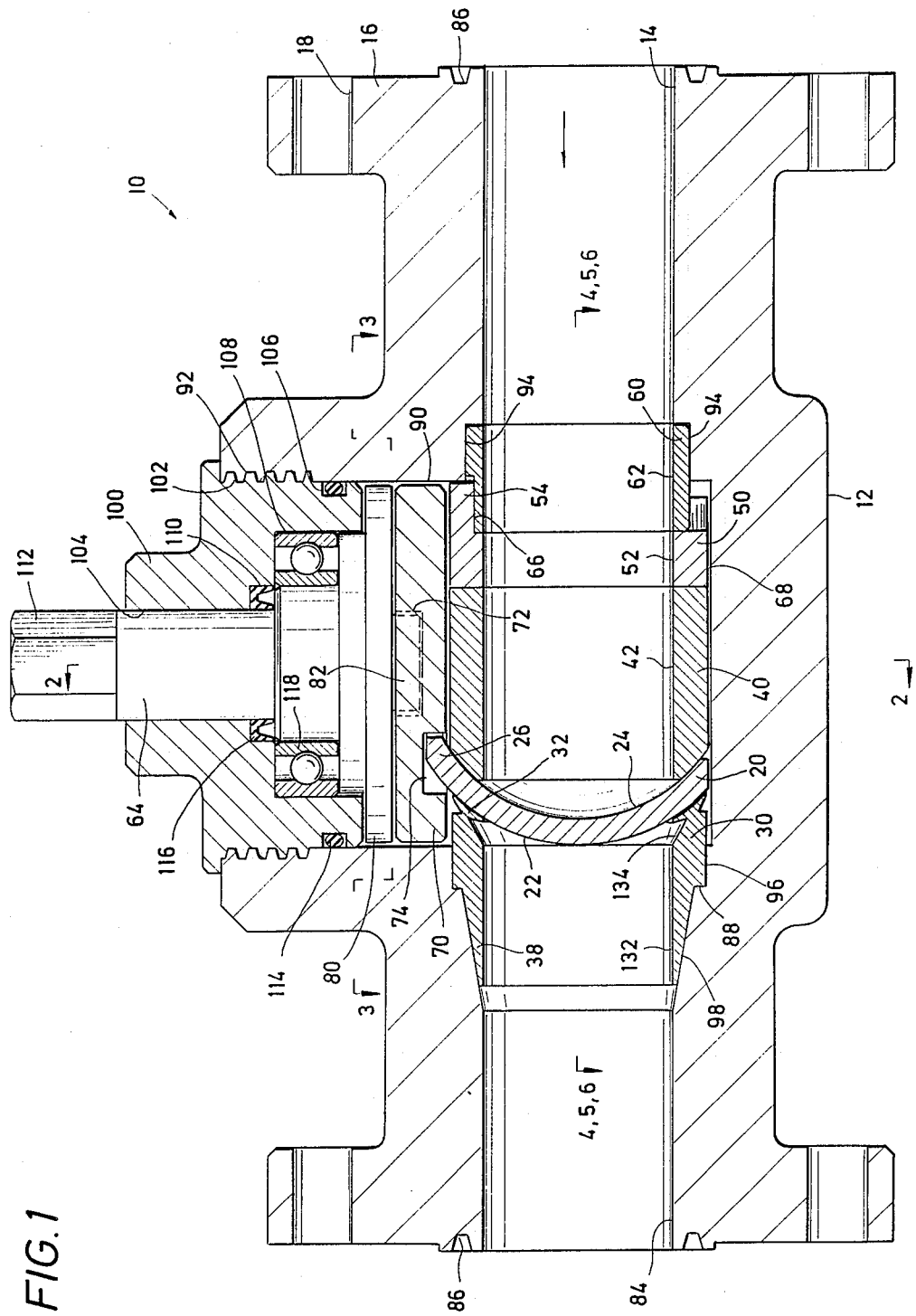
FIG. 1 is a cross-sectional representation along the flow path of a spherical, hemi-wedge valve in accord with the present invention.
Figure 2:
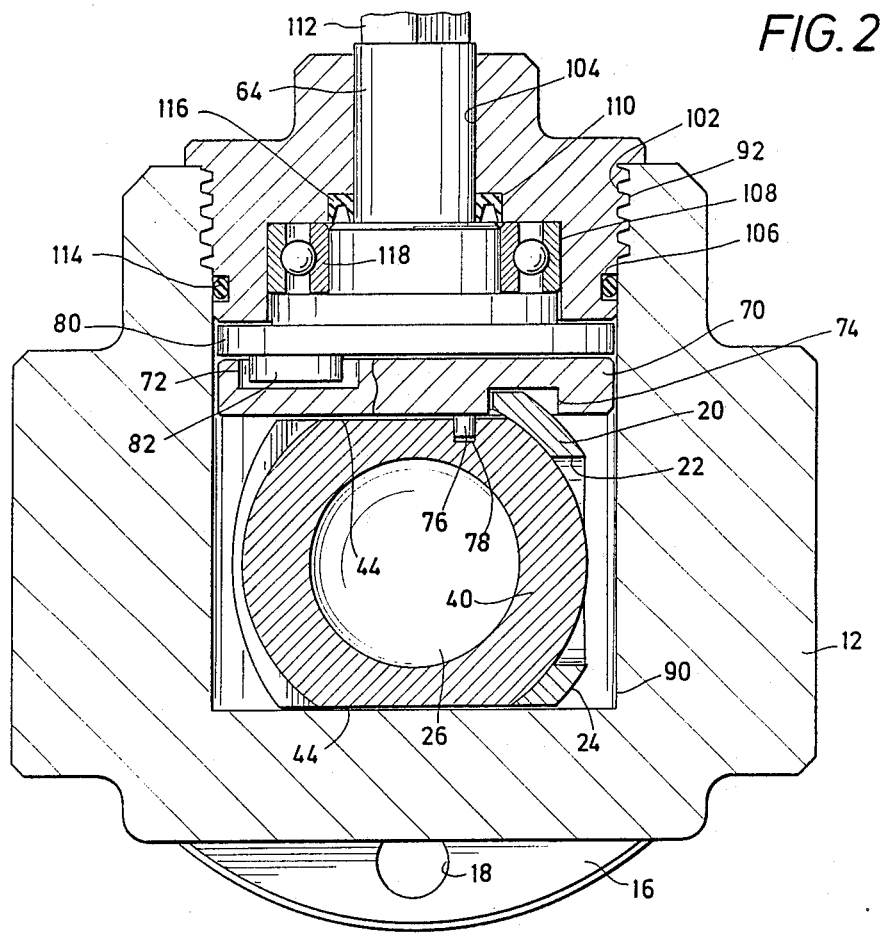
FIG. 2 is a cross-setional representation across the fluid flow path along line 2—2 of the spherical, hemi-wedge valve of FIG. 1.
Figure 3:
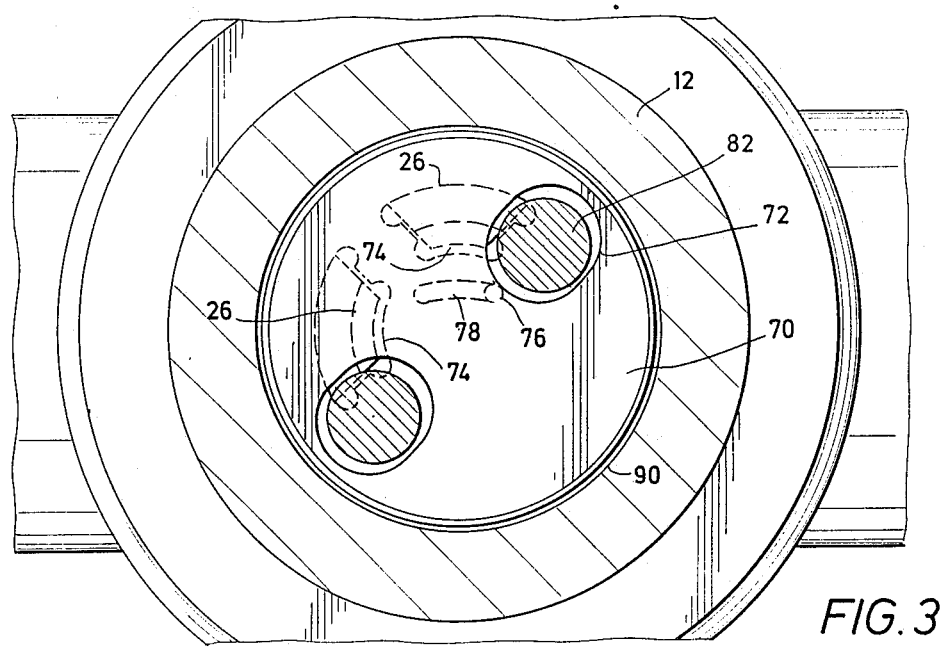
FIG. 3 is a cross-sectional representation along the line 3—3 of the spherical, hemi-wedge valve of FIG. 1.
Figure 9:
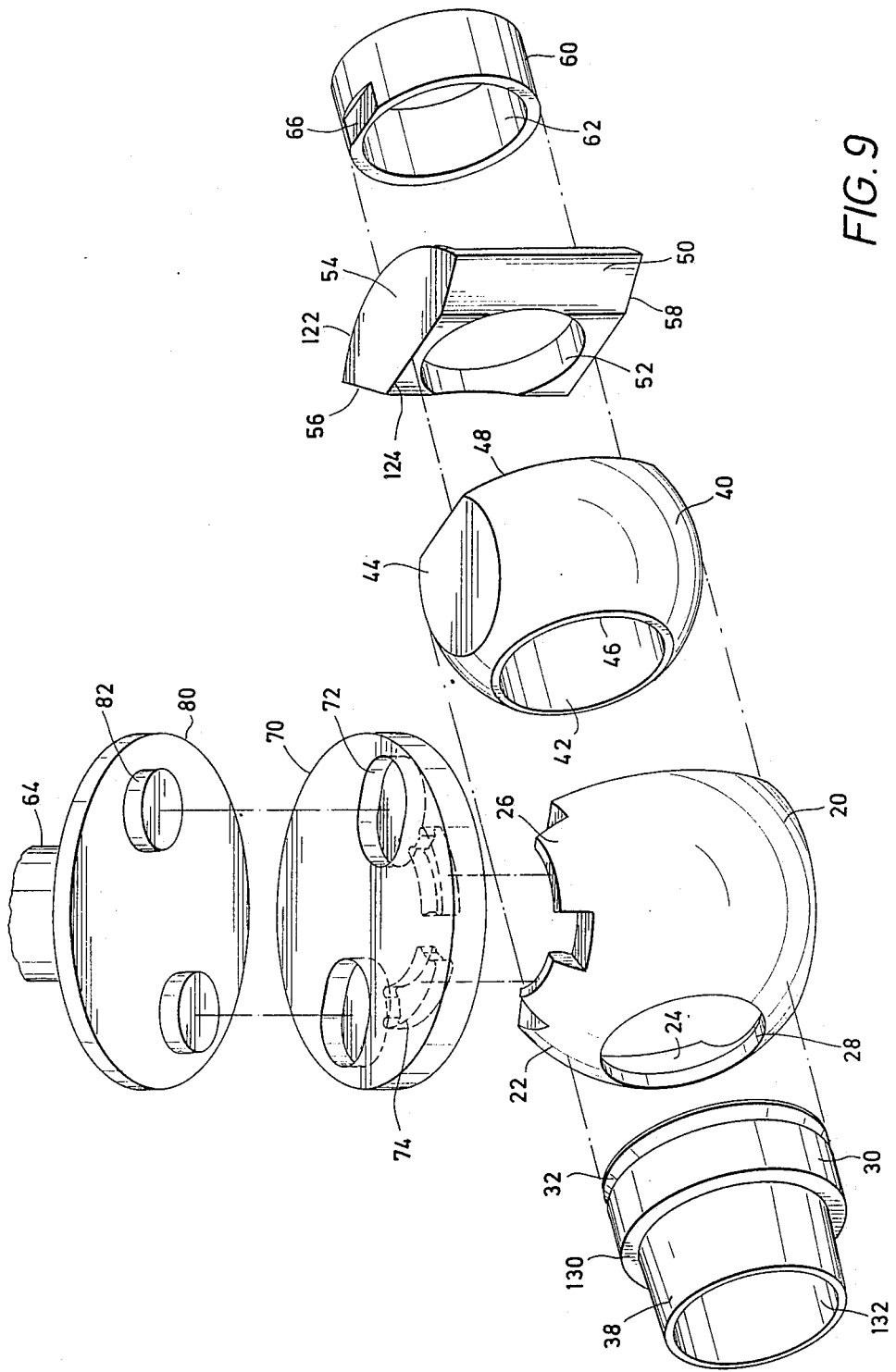
FIG. 9 is an exploded perspective view of the main, internal components of the spherical, hemi-wedge valve of FIG. 1.

The main internal components of the hemi-wedge valve 10 of the present invention are illustrated in exploded perspective in FIG. 9. FIGS. 1-3 illustrate in various cross sections as assembled hemi-wedge valve of the present invention. The main component is spherical, hemi-wedge 20 characterized by bore 28, preferably of the same diameter as the fluid flow line in which the valve will be disposed, through the thinner end of the curved wedge. Hemi-wedge 20 is further characterized b a first, convex sealing face 22 for cooperative with seat 32 of seat insert 30 and a second, concave thrust face 24 for cooperation with relatively fixed thrust ball 40.

Seat 32 is preferably defined on the end of seat insert 30. Seat insert 30 is characterized by seat insert flow bore 132 therethrough and includes tapered end 38 opposite seat 32 for biasing seat 32 towards sealing face 22 of hemi-wedge 20.

Thurst ball 40 is a stationary spacer having a curved face complimentary to the concave curve of thrust face 24 of hemi-wedge 20. Thrust ball 40 is characterized by flow bore 42 therethrough and spherical thrust surface 46 for cooperation with thrust face 24. The top 44 and bottom 44 of thrust ball 40 are flat to facilitate assembly in bore 90 and cooperation with hemi-wedge drive plate 70. End 48 is also flat to facilitate installation by cooperation with stop spacer 50.

Stop spacer 50 is characterized by flow bore 52 therethrough, flat face 124 for abutment with face 48 of thrust ball 40, curved face 122 for cooperation with the interior of the actuator bore 90 of the valve housing 12 and top 54 and bottom 68 which are flat to facilitate installation and to accomodate drive plate 70. FIG. 1 illustrates that the curved extension of top 54 which cooperates with bore 90 is not present on bottom 68. The removal of this extension from bottom 68 enables insertion of stop spacer 50 as the last piece in assembly of the flow path components. Finally, stop spacer 50 is characterized by ends 56 and 58 defining, respectively, the closed and opened stop positions.

Spacer insert 60 includes flow bore 62 therethrough and flat key 66 to aid positioning of stop spacer 50 by cooperation between top 54 and key 66. Spacer 60 is optional, but simplifies assembly, positioning and alignment of the internal components along the flow bore of valve 10. Hemi-wedge 20 further includes keys 26 providing linkage to the actuator mechanism. Keys 26 cooperate with the curved key holes 74 on the lower surface of hemi-wedge drive plate 70. Hemi-wedge drive plate 70 further includes on the top surface thereof oval key holes 72 for cooperation with drive keys 82 on the lower surface of actuator drive plate 80 disposed on the end of actuator shaft 64.

The assembled hemi-wedge valve 10 of the present invention will be described further with reference to FIGS. 1-3. Hemi-wedge valve 10 comprises a valve housing 12 into which are disposed hemi-wedge 20, seat insert 30, thrust ball 40, stop spacer 50, spacer insert 60, hemi-wedge drive plate 70, and actuator drive plate 80 as described above with reference to FIG. 9. Valve housing 12, is characterized by a fluid path therethrough defined by inlet flow bore 14, flow bore 62 of spacer insert 60, flow bore 52 of stop spacer 50, flow bore 42 of thrust ball 40, flow bore 28 of hemi-wedge 20, flow bore 132 of seat insert 30 and outlet bore 84. Housing 12 further includes flanges 16 extending outwardly about inlet 14 and outlet 84 and having therein bores 18 for receiving botls (not shown) for installation of valve 10 within a conventional pipeline. Housing 12 further includes tapered grooves 86 concentrically disposed in flanges 16 about inlet 14 and outlet 84 to carry conventional O-rings or other seals (not shown). It should be noted that hemi-wedge valve 10 provides excellent sealing in both directions and, accordingly, that the descriptions of inlet bore 14 and outlet bore 84 may be reversed for flow in the opposite direction.

Valve housing 12 is characterized by assembly and actuator bore 90 within the central portion thereof. Assembly and acutator bore 90 facilitates assembly of the internal components of valve 10 and provides an opening for actuator or stem 64. Inlet bore 14 is enlarged 94 at its intersection with actuator bore 90 for accomodation of spacer insert 60. Outlet bore 84 is enlarged 96 at its intersection with actuator bore 90 for accomodation of seat insert 30. Further, outlet bore 84 is tapered 98 to insert stop 88.

The described configuration facilitates assembly of the internal components of hemi-wedge valve 10 through assembly and actuator bore 90. Seat insert 30 and spacer insert 60 are installed within respective enlarged bores 96 and 94. Hemi-wedge 20 and ball 40 are next installed through bore 90 and disposed along the flow path. Finally, stop spacer 50 is installed between spacer 60 and ball 40 as illustrated in FIG. 1. Assembly is completed by disposing hemi-wedge drive plate 70 within bore 90 so that curved key holes 74 therein cooperate with kesy 26 on hemi-wedge 20. Installation is completed by positioning actuator drive plate 80 attached to actuator shaft 64 so that drive keys 82 cooperate with oval key holes 72. Final assembly includes installation of an appropriate stuffing box assembly about actuator shaft 64.

Assembly and actuator bore 90 is threaded 92 for receiving an appropriate packing nut 100. Packing nut 100 is threaded 102 about its periphery for threaded installation with threads 92 of assembly and actuator bore 90. Nut 100 is characterized by central bore 104 for receiving actuator shaft 64. Central bore 104 has been enlarged at 110 to receive conventional seals 116 for sealing about actuator shaft 64. Bore 104 has been further enlarged 108 for receiving conventional thrust bearings 118 between packing nut 100 and drive plate 80. Finally, nut 100 includes groove 106 about itsd periphery into which is disposed a conventional O-ring 114 for sealing between the nut 100 and the housing 12. Shaft 64 includes on its end external to the housing an appropriate key 112 for placement of a handle (not shown), e.g., a lever, wheel or other appropriate device.

Figure 4:
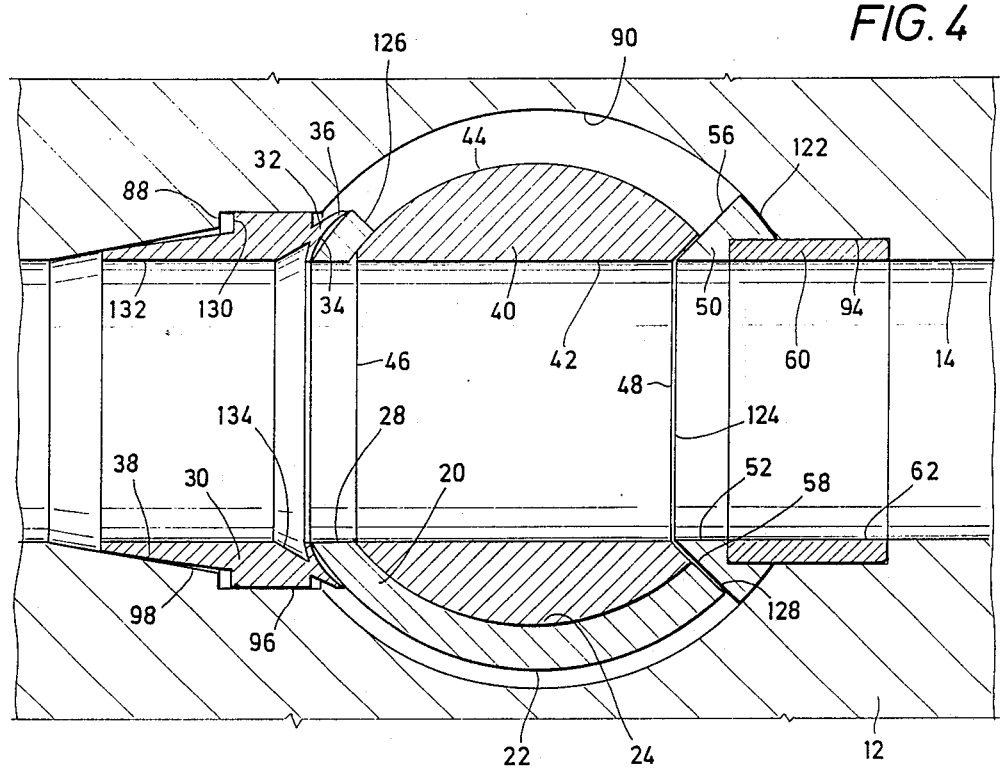
FIG. 4 is a cross-sectional representation along the line 4—4 of FIG. 1 illustrating a spherical, hemi-wedge valve in accord with the present invention in the fully opened position.
Figure 5:
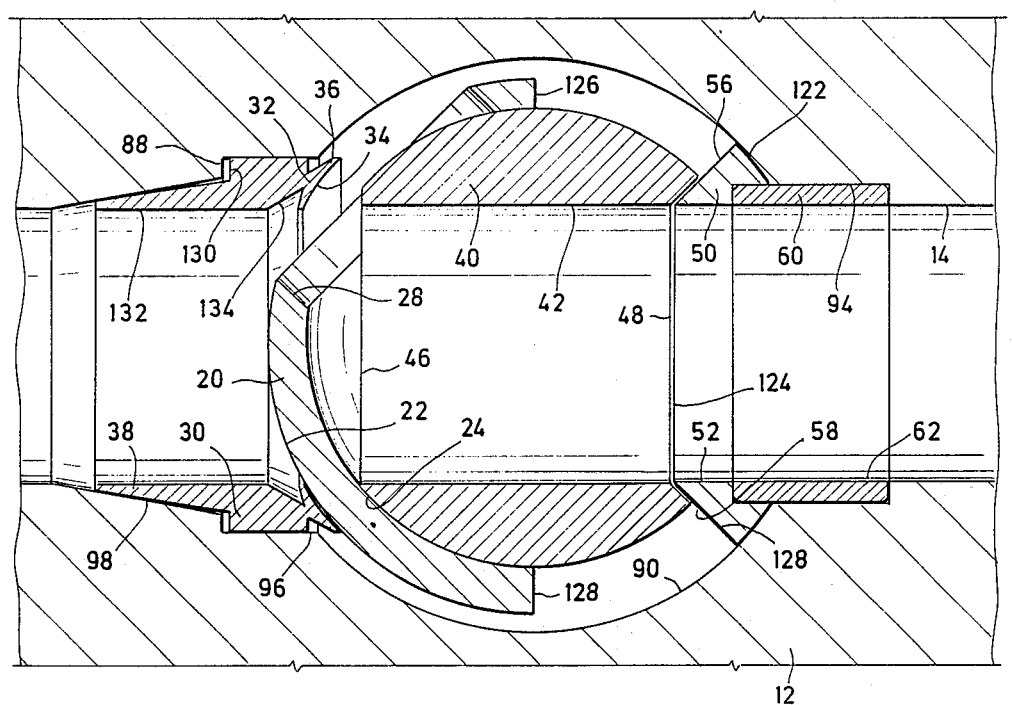
FIG. 5 is a cross-sectional representation along line 5—5 of FIG. 1 of a spherical, hemi-wedge valve in accord with the present invention in a partially opened position.
Figure 6:
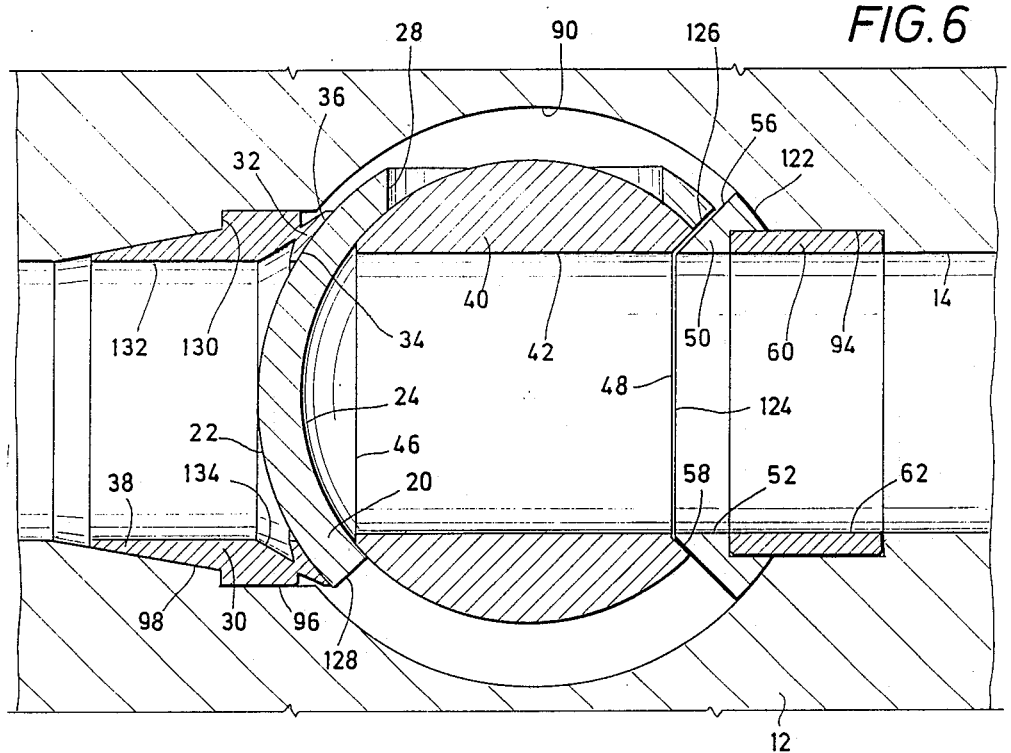
FIG. 6 is a cross-sectional representation along the line 6—6 of FIG. 1 of a spherical, hemi-wedge valve in accord with the present invention in the fully closed position.

Operation of the hemi-wedge valve of the present invention is illustrated in the top cross-sectional representations of FIGS. 4-6. FIG. 4 illustrates the valve in its fully-opened position. In this position, hemi-wedge 20 is positioned so that flow bore 28 therein aligns with the flow path through housing 12. This alignment is positively achieved when stop end 128 of hemi-wedge 20 contacts open stop 58 of stop 50. In FIG. 5, hemi-wedge 20 has been rotated approximately forty-five degrees (45°) to bring the valve into a partially opened position. In FIG. 6, the valve has been fully closed by continuing rotation of hemi-wedge 20 through a full ninety degrees (90°) until closed stop 126 thereon contacts closed stop 56 of stop spacer 50.

FIGS. 4-6 illustrate an important feature of the present invention. Hemi-wedge 20 is thicker at the end near opened stop 128 than at the end near closed stop 126 as can be seen in any of FIG. 4-6. This feature is readily achieved by defining convex, seal face 22 and concave, thrust face 24 by spheres each having a radius and center point located to produce the desired configuration. An exemplary way of achieving this result is to construct both surfaces 22 and 24 with the same radius but to locate the center of the sphere defining seal face 22 on the axis of the bore defining flow bore 28 while locating the center of the sphere defining thrust face 24 off that axis. When so constructed, rotation of hemi-wedge 20 between opened and closed positions as illustrated in FIGS. 4-6 displaces seal face 22 toward seat 32 while maintaining face 22 and seat 32 in constant relative orientation. This is achieved because the center of seal face 22 moves longitudinally along the axis toward seat 32. However, this movement causes the center of eccentric thrust face 24 to move perpendicularly thereto, away from the axis as hemi-wedge 20 moves from the opened position of FIG. 4 to the partially opened position of FIG. 5 and to perpendicularly return toward the axis as the hemi-wedge continues to move to the closed position of FIG. 6.

This eccentric movement is accommodated by employing a sloppy fit for keys 26 within curved key holes 74 and drive keys 82 within oval key holes 72 as illustrated in FIG. 3. In an optional feature of the present invention, this eccentric movement is advantageously employed through key 76 protruding from hemi-wedge drive plate 70 into groove 78 in the top of thrust ball 40. Groove 78 is dipsosed offset from, but generally along the above-referenced axis. Groove 78 is sized and located to accomodate movement of key 76 as hemi-wedge drive plate 70 rotates. By decreasing the radius of groove 78 from that traced by key 76 by the eccentricity between the centers of the spheres of which surfaces 22 and 24 are formed, key 76 will tend to move thrust ball 40 to accomodate this perpendicular movement caused by the eccentricity of surfaces 22 and 24. This optional feature aids in maintaining thrust ball 40 in the desired alignment along the fluid flow path.

Figure 7:
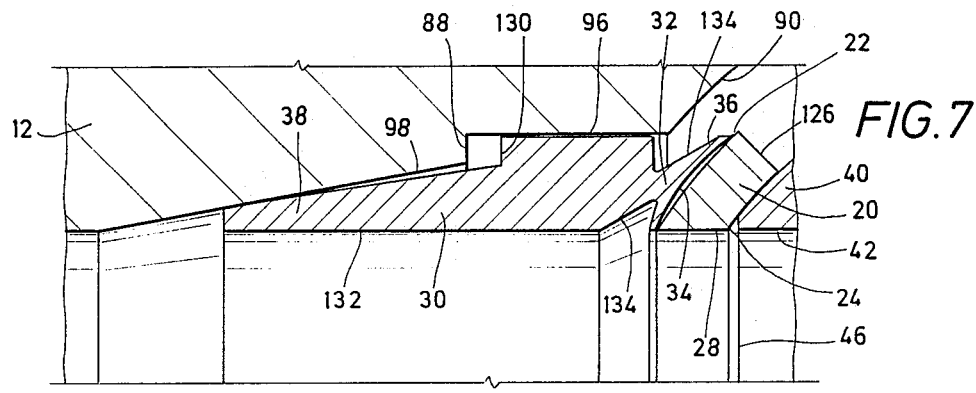
FIG. 7 is an enlarged cross-sectional representation of the seat insert and biasing means of the opened, hemi-wedge valve of FIG. 4.
Figure 8:
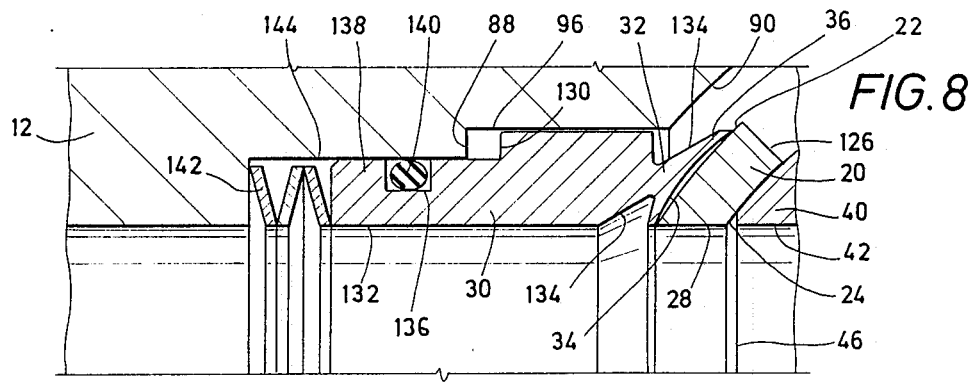
FIG. 8 is a cross-sectional representation of an alternative biasing means and seat insert for use in a hemi-wedge valve in accord with the present invention.

Other optional features of the present invention are illustrated in FIGS. 7 and 8. These features include the biasing of the seat 32 toward the hemi-wedge 20 and the use of a resiliently deformable seat sealing surface, both of which provide improved seal integrity.

FIG. 7 illustrates the preferred seat configuration. In FIG. 7, seat 32 is integrally formed on the end of seat insert 30. Seat 32 is formed by undercutting seat 32 at 134, both internally and externally, to provide seat 32 with resiliently deformable edges 36. Preferably, seat contact surface 34 is also concave between seat contact edges 36. This configuration permits seat contact edges 36 to be resiliently deformed in response to pressure between hemi-wedge 20 and seat 32 to provide enlarged sealing surface as convex surface 22 of hemi-wedge 20 is moved toward seat insert 30. In the most preferred embodiment, seat 32 and hemi-wedge 20 are metallic to provide a metal-to-metal seal. Such metal-to-metal seals are particularly useful in high pressure lines carrying flammable fluids. In an alternative embodiment, seat 32 may be separate from seat insert 30 and replaceable disposed on the end thereof, thus forming an easily and cheaply replaceable part.

Biasing of seat 32 toward hemi-wedge 20 is provided in the preferred embodiment by conventional Grayloc TM means. Seat insert 30 is tapered 38 at its end away from seat 32 to seat insert stop 130. Taper 38 is at a lesser angle than taper 98 of the receiving bore in housing 12. Accordingly, the action of taper 38 of seat insert 30 within tapered bore 98 will tend to bias seat insert 30 outwardly from tapered bore 98 and toward hemi-wedge 20. Biasing of seat 32 toward hemi-wedge 20 makes hemi-wedge valve 10 particularly useful for sealing with fluid flow in either direction. This biasing means is also advantageous in high pressure or flammable fluid environments because the interaction between taper 38 of seat insert 30 and tapered bore 98 provides a metal-to-metal seal therebetween.

FIG. 8 illustrates an alternative biasing and sealing system. In this alternative embodiment the end 138 of seat insert 30 is not tapered but has been turned to a smaller diameter for cooperation with intermediate bore 144 in housing 12. Sealing between seat insert 30 and housing 12 is provided by O-ring 140 disposed in O-ring groove 136. Biasing is provided by conventional springs, e.g., Belleville springs 142, disposed within bore 144 between housing 12 and seat insert 30.

The foregoing description of the invention has been directed in primary part to a particular, preferred embodiment in accordance with the requirements of the patent statutes and for purposes of illustration. It will be apparent, however, to those skilled in the art that many modifications and changes in the specifically described hemi-wedge valve 10 may be made without departing from the scope and spirit of the invention. For example, sealing surface 22 of hemi-wedge 20 may alternatively be formed as a portion of a cylinder, preferably a right cylinder, for cooperation with a complimentary seat. Further, movement of the sealing surface of hemi-wedge 20 toward the seat may be achieved by contact between any appropriately shaped thrust surface 24 with a complimentary thrust member 40. Those skilled in the art will be able to construct hemi-wedges having the desired configuration by employing many design parameters to produce curved surfaces 22 and 24 to achieve the desired action. Therefore, the invention is not restricted to the preferred embodiment illustrated but covers all modifications which may fall within the scope of the following claims.

What is claimed is:

1. An improved valve, comprising:
   a valve housing;
   a fluid path through said housing from an inlet to an outlet both in said housing;
   a valve seat disposed about said fluid path between said inlet and said outlet;
   a rotatatable, curved wedge disposed in said fluid path, said wedge rotatable between an opened and a closed position, said wedge having a first, convex surface adjacent said valve seat and a second, concave surface opposite said valve seat, said surfaces forming a curved wedge having a thickness progressively increasing from a first end to a second end, said wedge having near said first end an opening through its thickness between said convex and concave surfaces to form a part of said fluid path in said opened position, said wedge blocking said fluid path with said progressively increasing thickness near its second end in said closed position to provide a more effective seal with said valve seat, said first surface being sufficiently large to shield and seal against said valve seat from fluid in said flow path in both said opened and closed positions;
   means for actuating said rotatable, curved wedge between said opened and closed positions, said actuating means operatively connected with said wedge and extending through a sealed actuator opening in said housing; and
   means for displacing said first surface toward said valve seat along fluid path as said rotatable wedge is rotated from said opened to said closed position.

2. The improved valve of claim 1 wherein said displacing means comprises a relatively fixed thrust member positioned adjacent said secocnd surface.

3. The improved valve of claim 2 wherein said thrust member is characterized by a curved surface adjacent and complimentary to said second surface.

4. The improved valve of claim 1 wherein said valve seat is displaceable along said fluid path.

5. The improved valve of claim 4 further comprising means for biasing said valve seat toward said wedge.

6. The improved valve of claim 5 wherein said valve seat and said biasing means comprise an integral seat insert assembly.

7. The improved valve of claim 1 wherein said valve seat is circular, said first and second surfaces are portions of spheres, and said seat and said first surface are displaceable along a line defined by the center of said valve seat and the center of the sphere of said first surface.

8. The improved valve to claim 7 wherein said second surface is a portion of a second sphere and wherein the center of said second sphere is not disposed along said line and is displaceable substantially perpendicular to and not substantially linearly along said line.

9. The improved valve of claim 1 wherein said first and second surfaces are portions of cylinders and said seat is complimentary thereto.

10. The improved valve of claim 1 further comprising stops disposed within said housing for defining the fully opened and fully closed positions of said wedge.

11. The improved valve of claim 10 wherein rotation through not more than about ninety degrees actuates said wedge from fully closed to said fully opened position.

12. The improved valve of claim 1 wherein said seat is resiliently deformable in response to relative movement between said seat and said first surface.

13. The improved valve of claim 12 wherein the sealing surface of said seat is concavely recessed to provide initial sealing contact with said wedge at its leading edges and to provide increased sealing contact as said seat and said first surface are displaced toward one another.

14. An improved valve, comprising:
   a valve housing;
   a fluid path through said housing from an inlet to an outlet both in said housing;
   a valve seat disposed about said fluid path between said inlet and said outlet, said seat displaceable along said fluid path;
   a rotatable member disposed in said fluid path, said member rotatable between an opened and a closed position said member having an outside, curved surface and an inside, curved surface, said surfaces forming a curved wedge having a thickness progressively increasing from a first end to a seocnd end and wherein one of said curved surfaces is adjacent said valve seat for sealing therewith;
   means for actuating said rotatable member extending through a sealed actuator opening in said housing; and
   means for displacing said curved sealing surface toward said valve seat along said fluid path as said rotatable member rotates from said opened to said closed position to provide a more effective seal with said valve seat.

15. The improved valved of claim 14 further comprising means biasing said valve seat toward said rotatable member.

16. The improved valve of claim 14 wherein said curved surfaces are portions of spheres.

17. The improved valve of claim 16 wherein said first and second curved surfaces have the same radius but different center points.

18. The improved valve of claim 14 wherein said curved surfaces are portions of cylinders.

19. The improved valve of claim 14 wherein siad rotatable member is rotatable, curved wedge disposed in said fluid path, said wedge rotatable between an opened and a closed position, said wedge having a first, convex surface adjacent said valve seat and a second, concave surface opposite said valve seat, said surfaces forming a curved wedge having a thickness progressively increasing from a first end to a second end, said wedge having near said first end an opening through its thickness between said convex and concave surfaces to form a part of said fluid path in said opened position, said wedge blocking said fluid path with said progressively increasing thickness near its second end in said closed position to provide a more effective seal with said valve seat, said first surface being sufficiently large to shield and seal against said valve seat from fluid in said flow path in both said opened and closed positions.

20. The improved valve of claim 14 wherein said first and second curved surfaces are not concentric.

* * * * *

UNITED STATES PATENT AND TRADEMARK OFFICE
CERTIFICATE OF CORRECTION

PATENT NO. : 4,962,911

DATED : October 16, 1990

INVENTOR(S) : Paul B. Soderberg

It is certified that error appears in the above-identified patent and that said Letters Patent is hereby corrected as shown below:

In column 7, Claim 1, line 38, delete "rotatatable" and insert therefor --rotatable--.

In column 7, Claim 1, line 61, after "along" insert --said--.

In column 7, Claim 2, line 65, delete "secocnd" and insert therefor --second--.

In column 8, Claim 11, line 27, after "from" insert --said--.

In column 8, Claim 12, line 30, delete "resililently" and insert therefor --resiliently--.

In column 8, Claim 14, line 47, insert a comma following "position".

In column 8, Claim 14, line 50, delete "seocnd" and insert therefor --second--.

In column 8, Claim 15, line 61, delete "valved" and insert therefor --valve--.

UNITED STATES PATENT AND TRADEMARK OFFICE
CERTIFICATE OF CORRECTION

PATENT NO. : 4,962,911

DATED : October 16, 1990

INVENTOR(S) : Paul B. Soderberg

It is certified that error appears in the above-identified patent and that said Letters Patent is hereby corrected as shown below:

In column 9, Claim 19, line 3, delete "siad" and insert therefore --said--.

In column 9, Claim 19, line 4, after "is" insert --a--.

Signed and Sealed this

Seventh Day of January, 1992

Attest:

HARRY F. MANBECK, JR.

*Attesting Officer*  *Commissioner of Patents and Trademarks*